United States Patent [19]
Kamegawa

[11] Patent Number: 5,568,259
[45] Date of Patent: Oct. 22, 1996

[54] ELONGATION MEASURING METHOD AND LASER NONCONTACT EXTENSOMETER

[75] Inventor: Masayuki Kamegawa, Nara, Japan

[73] Assignee: Shimadzu Corporation, Kyoto, Japan

[21] Appl. No.: 494,219

[22] Filed: Jun. 23, 1995

[30] Foreign Application Priority Data

Jul. 27, 1994 [JP] Japan ................................. 6-175339

[51] Int. Cl.⁶ ............................................... G01B 11/14
[52] U.S. Cl. ................ 356/373; 356/394; 356/32; 356/33; 73/862.624; 73/862.625; 73/800
[58] Field of Search ......................... 356/32, 33, 373, 356/394; 73/862.624, 862.625

[56] References Cited

U.S. PATENT DOCUMENTS 4,436,419  3/1984  Stetson et al. ..................... 356/35.5

FOREIGN PATENT DOCUMENTS

| 0629835 | 12/1994 | European Pat. Off. |
| 57-40603 | 6/1982 | Japan . |
| 2150110 | 7/1987 | Japan . |
| 63-58205 | 3/1988 | Japan . |
| 4127005 | 4/1992 | Japan . |

*Primary Examiner*—Richard A. Rosenberger
*Assistant Examiner*—Robert Kim
*Attorney, Agent, or Firm*—Nikaido, Marmelstein, Murray & Oram LLP

[57] ABSTRACT

The present invention is arranged such that: laser light is irradiated onto the surface of a specimen over a predetermined length thereof in the direction of elongation to be measured; that scattering light of the laser light reflected from the specimen surface is photoelectrically converted to obtain speckle pattern data; out of the speckle pattern data thus obtained, the data from two zones on the specimen which are separated from each other by a predetermined distance in the elongation direction, are initially set as observation point data; with the use of the observation point data, the amounts of movement of the speckle patterns from the two zones on the specimen are calculated; the zones serving as observation point data sources are shifted in the speckle pattern movement direction each time the calculation results of the speckle pattern movement amounts reach a predetermined amount; and the elongation of the specimen between the initially set two zones is calculated based on (i) the shift amounts of the observation point data sources and (ii) the speckle pattern movement amounts calculated with the use of the observation point data.

12 Claims, 4 Drawing Sheets

Elongation

ELONGATION MEASURING METHOD AND LASER NONCONTACT EXTENSOMETER

BACKGROUND OF THE INVENTION

The present invention relates to a method of measuring, in a noncontact manner using laser light, the amount of elongation/contraction of, for example, a specimen mounted on a material testing machine, and also relates to a laser noncontact extensometer as apparatus which embodies the method above-mentioned.

The following methods are known as examples of the technique of measuring, in a noncontact manner, the amount of elongation (the amount of contraction; this also applies to the following description) of a specimen with the use of reflected light obtained by irradiating laser light onto the surface of the specimen: a method using speckle patterns, a method using a laser Doppler effect and a method in which marks are attached to two parts of the surface of a specimen, the positions of the marks are measured using laser light and the distance between the two marks is calculated from moment to moment.

According to the method using speckle patterns, a laser spotlight is irradiated onto a specimen at a single irradiation position which is a fixed and predetermined position, and scattering light reflected from the specimen surface is measured at each of two different positions, thus measuring two speckle patterns. Then, the cross-correlation functions of the speckle patterns are obtained such that the amounts of movement of the speckle patterns are calculated. Then, the difference between these movement amounts is obtained, and there are cancelled each other the pieces of information relating to the amounts of translation contained in the calculated results of speckle pattern movement amount. Thus, only the amount of distortion in the laser spot remains (Japanese Patent Publication No. 61-27681).

According to the method using a Doppler effect, the amount of elongation of a specimen between two parts thereof is calculated based on the following principle. Two laser beams respectively having different wavelengths are irradiated, as forming a certain angle, onto a specimen at a single stationary and predetermined point, thus producing interference fringes as modulated by a difference in frequency between the two laser beams. When the specimen is moved, the Doppler effect causes the modulated frequency of the interference fringes to be shifted by an amount corresponding to the moving speed of the specimen. With the use of this phenomenon, the moving speed can be obtained and then subjected to time quadrature such that the movement amount of the specimen at the laser beam irradiation position can be obtained. When, with the use of this principle, the movement amounts of the specimen at two parts thereof are obtained and the difference between these movement amounts thus obtained is calculated, the amount of elongation of the specimen between these two parts can be obtained.

According to the method of measuring the positions of two marks attached to a specimen with the use of laser light, laser light in the form of a spotlight is irradiated to a specimen while the specimen is being scanned by the laser light in the elongation direction with the use of a polygon mirror or the like, and the intensity of the reflected light is continuously detected such that the positions of the two marks are obtained from moment to moment. Based on the variations of the mark positions, the elongation of the specimen between the two marks is obtained.

The inventor of the present invention has proposed two techniques using speckle patterns, i.e., ① one technique by which the amounts of movement of speckle patterns at two parts of a specimen are obtained, the difference therebetween is then calculated, the pieces of distortion information contained in the respective movement amount data are cancelled each other and the amount of elongation or contraction of the specimen between the two parts is calculated, and ② the other technique by which, with the use of calculation results of movement amount of two parts of a specimen as calculated with the use of such speckle patterns or a laser Doppler effect, two laser irradiation positions are changed as following the deformation of a specimen such that the elongation of the specimen between two parts thereof is measured (Japanese Patent Laid-Open Publication 7-4928).

Out of the methods mentioned earlier, according to the method by which an amount of distortion is calculated based on two speckle patterns obtained by irradiating laser light onto a specimen at a single irradiation position, the obtained amount of elongation is limited to that of the specimen within the laser spot. Accordingly, even though a crack or the like has been produced on other parts of the specimen, such information is not reflected on the elongation data. Further, such elongation is completely different in concept from the elongation in accordance with JIS using a conventional contact-type mechanical extensometer or the like.

On the other hand, the situations of the broad zone between two parts of the specimen are reflected on the data of elongation obtained (i) according to the method ① which has been proposed by the inventor of the present invention and by which the movement amounts of speckle patterns at two parts of a specimen are obtained and the difference therebetween is then obtained, or (ii) according to the method by which, with the use of a laser Doppler effect, the movement amounts of a specimen at two parts thereof are obtained based on the moving speeds thereof and, according to the difference between the movement amounts thus obtained, the elongation of the specimen between the two parts thereof is obtained.

However, the elongation obtained based on the movement amounts of speckle patterns at two parts of a specimen or based on the movement amounts of two parts of a specimen using a Doppler effect, is different in concept from the elongation determined by JIS in that the laser irradiation positions undergo no change from the beginning. More specifically, when the distance between two laser irradiation positions is set to GL, the elongation obtained with the two laser irradiation positions fixed, refers to an integrated value of the movement amount of a specimen which has crossed two observation points fixed with the distance GL provided therebetween. On the other hand, the elongation stipulated in JIS tensile test, refers to a rate or amount of change which represents how the distance GL between the initially set two points (gage points) undergoes a change after the test has been conducted. Thus, both the elongations are not equivalent to each other. Further, according to the method by which the elongation of a specimen between two points is calculated without the laser irradiation positions changed, there is the likelihood that, when the elongation is large, the initially set two points deviate from the observation points due to the elongation of the specimen by the test, such that no accurate measurement is made.

It is the technique ② proposed by the inventor that has solved the problems above-mentioned. According to this technique, the laser light irradiation positions are changed to follow initially set two gage points according to the measurement results of movement amount, from moment to moment, of the gage points. It is therefore possible to obtain a measurement result of elongation similar to that obtained with a conventional mechanical contact-type extensometer. Further, by enlarging the range in which the laser light irradiation positions are moved, the technique ② can cope with a large elongation of a specimen.

However, this following method requires a complicated mechanism for changing the laser light irradiation positions. This is disadvantageous in that the apparatus is increased in cost and that errors are contained in a measurement result due to the errors of the mechanism.

On the other hand, according to the method by which the positions of two marks attached to a specimen are measured by laser light, the problems above-mentioned are not encountered. However, this method is disadvantageous in that a lot of labor is taken for attaching the marks and that a mark possibly comes off with the advance of the test.

OBJECTS AND SUMMARY OF THE INVENTION

Figure 1:
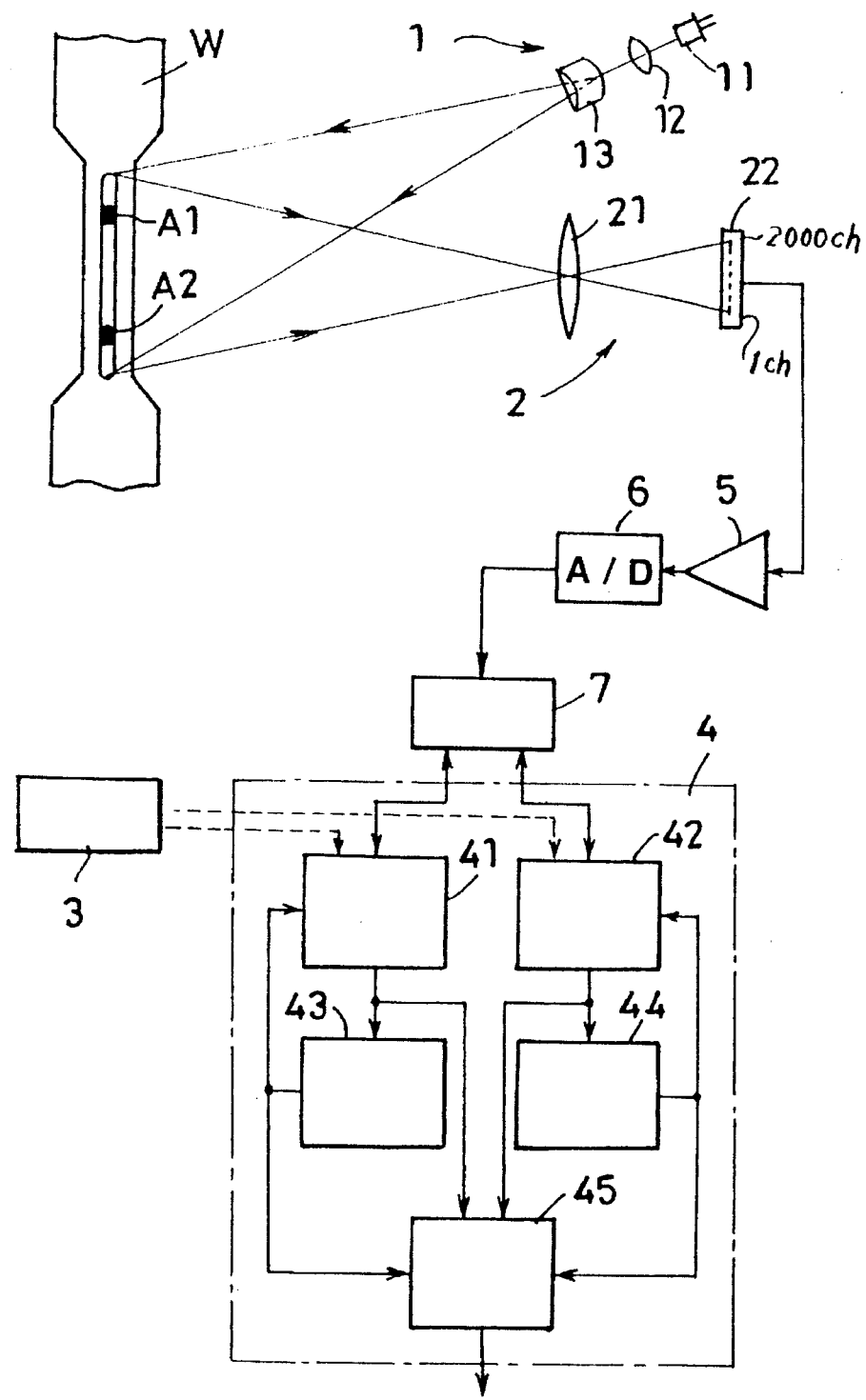
FIG. 1 is a schematic view illustrating the general arrangement of an embodiment of the present invention.

In view of the foregoing, the present invention is proposed with the object of providing an elongation measuring method and a laser noncontact extensometer each capable of directly obtaining a measured result of specimen elongation in accordance with JIS even though the elongation is large, without requiring both a mark or the like attached to a specimen and a complicated mechanism.

To achieve the object above-mentioned, the present invention provides an elongation measuring method comprising the steps of: irradiating laser light onto the surface of a specimen over a predetermined length thereof in the direction of elongation to be measured; photoelectrically converting that scattering light of the laser light which has been reflected from the specimen surface, thereby to obtain speckle pattern data; initially setting, as selected from the speckle pattern data thus obtained, the data from two zones on the specimen which are separated from each other by a predetermined distance in the elongation direction, the data being set as observation point data; calculating, with the use of the observation point data, the amounts of movement of the speckle patterns from the two zones on the specimen; shifting, in the direction of movement of the speckle patterns, the zones serving as observation point data sources each time the calculation results of the movement amounts reach a predetermined amount; and calculating the elongation of the specimen between the initially set two zones based on (i) the shift amounts of the observation point data sources and (ii) the speckle pattern movement amounts calculated with the use of the observation point data.

More specifically, according to this elongation measuring method of the present invention, laser light is irradiated onto a specimen at a zone thereof which is relatively long in the elongation measuring direction, and the scattering light reflected from the specimen is photoelectrically converted to obtain speckle pattern data contained in the scattering light reflected from the long irradiation zone. Two zones separated from each other by a certain distance in the elongation measuring direction, are initially set as observation points. With the use of the speckle pattern data from these zones, the amounts of movements of the speckle patterns in these zones are calculated such that the displacements of the observation point zones are obtained from moment to moment. The initially set two observation point zones are not fixed. Each time the displacements of the observation point zones reach a predetermined amount, the data to be used are shifted such that the observation point zones are substantially followed.

Accordingly, the present invention is basically arranged such that, based on the scattering light from the two observation points separated from each other by a predetermined distance in the specimen elongation direction, there are obtained the movement amounts of the speckle patterns at these two observation points, and that based on the difference between the movement amounts thus obtained, the elongation of the specimen between the two zones is calculated, and that the data are taken as if following the movements of the two observation points with the deformation of the specimen. According to the present invention, however, such pursuit is not made as done in the mentioned technique proposed by the inventor of the present invention in which the laser light irradiation positions are mechanically changed. According to the present invention, the speckle pattern data from the broad zone of the specimen in the elongation direction are taken and, out of the speckle pattern data thus taken, the data to be used for the speckle pattern movement amount calculation (observation point data) are shifted according to the deformation of the specimen.

Such a method of following the observation points by shifting the data, eliminates a complicated following mechanism and can cope with a large elongation of the specimen.

A laser noncontact extensometer according to the present invention utilizes this elongation measuring method of the present invention. As shown in FIG. 1 which illustrates an embodiment of the present invention, the laser noncontact extensometer of the present invention comprises: an irradiation optical system 1 for irradiating laser light onto the surface of a specimen W over a predetermined length thereof in the direction of elongation to be measured; scattering light detecting means 2 having a plurality of channels for receiving that scattering light of the laser light reflected from the specimen W, thereby to obtain speckle pattern data; setting means 3 for initially setting, out of output data from the scattering light detecting means 2, two data of a plurality of channels relating to the scattering light from two zones on the specimen W which are separated from each other by a predetermined distance in the elongation direction, the two data being set as two observation point data; movement amount calculating means 41, 42 for calculating, with the use of the two observation point data, the amounts of movement of the speckle patterns from the two zones on the specimen W; channel shift control means 43, 44 for shifting the channels to be used as observation point data sources in the speckle pattern moving direction according to the movement amounts calculated by the movement amount calculating means 41, 42, each time the movement amounts reach a predetermined amount; and elongation calculating means 45 for calculating the elongation of the specimen between the two zones initially set by the setting means 3, based on (i) the amount by which the channels relating to the two observation point data have been shifted by the channel shift control means 43, 44, and (ii) the amounts of movement of the speckle patterns from the two zones, calculated by the movement amount calculating means 41, 42.

According to the arrangement above-mentioned, the channel shifting operation according to the movement of the observation points, can be conducted in a software manner by an operational program incorporated in the extensometer. This enables the channel shifting operation to be momentarily conducted. Thus, there is no risk of the speckle patterns being disturbed when the laser light irradiation positions are followed, unlike in the method of mechanically following the laser light irradiation positions.

According to the laser noncontact extensometer according to a preferred embodiment of the present invention, the scattering light detecting means comprises an image sensor 22 having a plurality of channels and a condensing lens 21 for forming an image of scattering light on the light receiving surface of the image sensor 22.

Further, a plurality of sets of such a condensing lens and such an image sensor may be disposed such that the scattering light from the laser light irradiation zone on the specimen is received, as spatially divided into portions, by the plurality of sets of condensing lens and image sensor.

The irradiation optical system 1 for irradiating laser light onto a specimen may comprise: a semiconductor laser 11; a collimator lens 12 for converting light supplied from the semiconductor laser into a parallel light flux; and a beam expander 13 having two cylindrical lenses 13a, 13b for one-dimensionally expanding laser light which has passed through the collimator lens 12.

Further, such an irradiation optical system may be disposed in a plural number and these irradiation optical systems are arranged, as a whole, to irradiate laser light onto the surface of the specimen at a zone thereof extending in the direction of elongation to be measured. In such an arrangement, that laser light irradiation zone of the specimen surface to which laser light is to be irradiated by the irradiation optical systems, may be divided into two portions in the direction of elongation to be measured.

When the laser light irradiation zone on the specimen is divided into two portions, the scattering light detecting means may be disposed for each of the two divided portions of the laser irradiation zone.

It is not possible for the operator to apparently see, on the specimen or the extensometer, the operation of following the obesrvation points by shifting the channels. It is therefore preferable to dispose, as necessary, a display device of informing the operator of such a following operation or means of irradiating, onto the surface of a specimen, a spotlight movable according to the following operation.

DETAILED DESCRIPTION OF THE PREFERRED EMBODIMENTS

The following description will discuss preferred embodiments of the present invention with reference to the attached drawings.

FIG. 1 is a schematic view illustrating the general arrangement of an embodiment of the present invention. With a specimen W held at its both ends by the clamps of a material testing machine for example, a tension load is given to the specimen W in the vertical direction in FIG. 1. An irradiation optical system 1 irradiates uniform laser light onto the specimen W in a predetermined length of, for example 20 cm, in the elongation direction thereof.

The irradiation optical system 1 comprises a semiconductor laser 11, a collimator lens 12 for converting output light emitted from the semiconductor laser 11 into a parallel light flux and a beam expander 13 having two cylindrical lenses 13a, 13b for enlarging, only in the vertical direction, the laser light having passed through the collimator lens 12 and introducing the laser light thus enlarged to the specimen W.

That scattering light of the laser light from the irradiation optical system 1 which is reflected from the surface of the specimen W, is detected by scattering light detecting means 2 having a condensing lens 21 and a one-dimensional image sensor 22. The one-dimensional image sensor 22 has, for example, 2000 channels in which 2000 pixels are vertically arranged with pitches of 10 µm. The condensing lens 21 has a focal length of, for example, 4.4 cm. The condensing lens 21 is disposed at a position of 50 cm from the laser light irradiation surface of the specimen W, and the one-dimensional image sensor 22 is disposed at a position of 5 cm rearward of the condensing lens 21. The scattering light from the laser light irradiation zone having a length of 20 cm of the specimen W, is condensed by the condensing lens 21 and received, as reduced to $\frac{1}{10}$, by the light receiving surface of the one-dimensional image sensor 22.

The outputs from the channels of the one-dimensional image sensor 22 are amplified by an amplifier 5, digitalized by an A/D converter 6 and then stored in a memory 7. In the memory 7, data storing addresses are set for the respective channels of the one-dimensional image sensor 22, and the data from the channels are stored at the corresponding addresses. Except for the initial data to be used as reference data to be discussed later, the channel data in the memory 7 are read out, from moment to moment, by an operating unit 4 each time data is entered. After portions of the data have been subjected to an operation to be discussed later, all data are immediately thrown away and the memory 7 is to wait the arrival of the next data from the one-dimensional image sensor 22.

Figure 2:
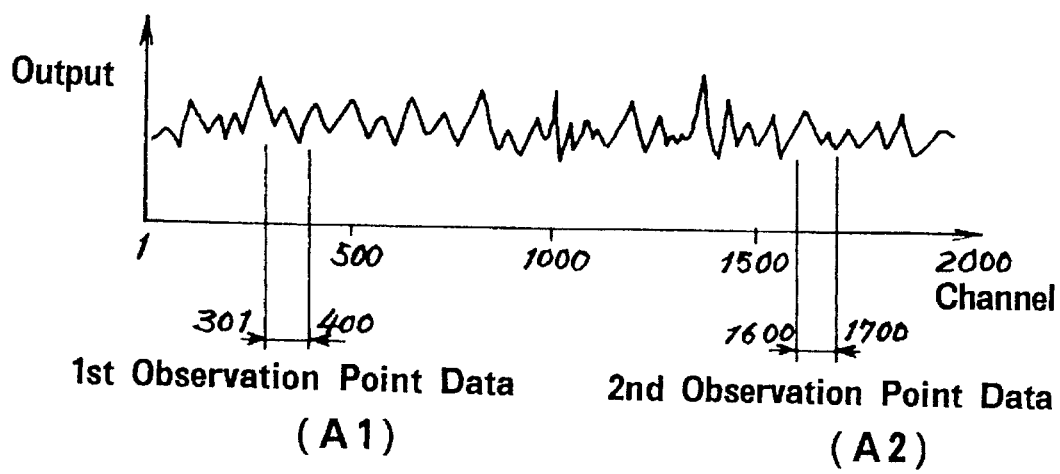
FIG. 2 is a graph illustrating a method of initially setting observation points by a setting device 3 in the embodiment of the present invention.

The operating unit 4 is shown as a block diagram by function, but is actually formed by a high-speed signal processing circuit and a CPU. Connected to the operating unit 4 is a setting device 3 for initially setting, as observation point data, the scattering light data from two zones of a specimen W equivalent to so-called two gage points in accordance with JIS, out of the data from the channels of the one-dimensional image sensor 22, the scattering light data being set before the test is conducted. Out of the first to 2000th channels in the one-dimensional image sensor 22, the setting device 3 sets, as the initial observation point data sources, for example, the 301th~the 400th channels as a first observation point data source and the 1601th~the 1700th channels as a second observation point data source, as shown in the graph of FIG. 2.

First and second movement amount calculating units 41, 42 are arranged to calculate the cross-correlation functions between (i) the scattering light data which come from upper and lower two zones A1 and A2 initially set by the setting device 3, i.e., the data group from the 301th ~400th channels of the one-dimensional image sensor 22 and the data group from the 1601th~1700th channels of the one-dimensional image sensor 22, these data groups serving as observation point data, and (ii) those data from the same channels which change with the passage of time. The first and second movement amount calculating units 41, 42 are arranged to obtain the amounts of movement of speckle patterns from the respective zones. More specifically, with the initial values of the observation point data serving as the reference data, there are calculated the cross-correlation functions of the reference data with respect to the subsequent observation point data from moment to moment, and the movement amounts of the maximum intensity positions are obtained.

The outputs of the first and second movement amount calculating units 41, 42 are supplied to an elongation calculating unit 45 and also to first and second channel shift control units 43, 44 which are respectively disposed as corresponding to the movement amount calculating units 41, 42. Each of the first and second channel shift control units 43, 44 is arranged such that, each time the supplied speckle pattern movement amount reaches a predetermined amount, e.g., a distance corresponding to 30 channels for example, or each time the actual speckle pattern movement amount on the specimen W reaches 300 μm in the arrangement of the optical system in FIG. 1, the channels serving as the observation point data sources are shifted by a distance corresponding to 30 channels in the movement direction. More specifically, when the movement amount of the speckle pattern from the first observation point data source reaches 300 μm, the channels to be used as a data source are shifted to the 331th–430th channels. Thereafter, the data to be used in the movement amount calculating unit 41 are changed to the data from the shifted channels. More specifically, at the time when the channels are shifted, the reference data so far used are thrown away, and with the initial data from the 331th–430th channels newly serving as the reference data, the cross-correlation functions of the reference data with respect to the subsequent data from the same channels are calculated from moment to moment. The foregoing also applies to the second observation point data source. Each time channels are shifted by a predetermined amount, such channel shift information is supplied to the elongation calculating unit 45.

The elongation calculating unit 45 calculates and supplies the elongation of the specimen between the initially set first and second zones, based on (i) the amounts S1, S2 of speckle pattern movements in the first and second zones, such movement amounts S1, S2 being supplied from the first and second movement amount calculating units 41, 42 and (ii) the amounts C1, C2 by which the channels are shifted in the first and second zones by the first and second channel shift control units 43, 44.

More specifically, when it is supposed that the movement amounts of speckle patterns from the first and second movement amount calculating units 41, 42 at the time when a certain period of time has passed after the test had started, are respectively set to S1, S2, and that the channel shift amounts at the time above-mentioned, are respectively set to C1, C2, the displacements $\delta_1, \delta_2$ of the initially set first and second zones A1, A2 at the time above-mentioned, are respectively expressed as follows:

$$\delta_1 = C_1 + S_1$$

$$\delta_2 = C_2 + S_2$$

Accordingly, the elongation Δ of the specimen between the first and second zones A1, A2 at the time above-mentioned can be calculated according to the following equation:

$$\Delta = \delta_1 - \delta_2 = (C_1 + S_1) - (C_2 + S_2)$$

The elongation Δ thus obtained is equal to the elongation according to JIS with the center positions of the channels of the initially set first and second observation point data sources serving as the gage points, i.e., with the images of the specimen W on the 350th and 1650th channels serving as the gage points or with the center points of the zones A1, A2 serving as the gage points. Further, when the elongation Δ is divided by the initial distance between the gage points, there is obtained a so-called elongation rate according to JIS.

The predetermined speckle pattern movement amount by which channels are to be shifted, may be optional. However, the maximum intensity of the cross-correlation function calculated by the first or second movement amount calculating unit 41, 42, is lowered with the movement of the speckle pattern. This makes it difficult to identify the position of the maximum intensity. It is therefore desired to set the predetermined speckle pattern movement amount within the range that the position of the maximum intensity can clearly be identified.

In the embodiment above-mentioned, until each of the speckle pattern movement amounts calculated by the speckle pattern movement amount calculating units 41, 42, reaches a distance corresponding to 30 channels for example, there are continuously used the data from the channels identical with the channels of which data are used as the reference data. However, the present invention is not limited to such an arrangement. For example, the present invention may be arranged such that the data to be used as the reference data are shifted by stages each time each speckle pattern movement amount reaches the predetermined amount and that data from moment to moment with respect to which the cross-correlation functions of the reference data are to be calculated, are shifted each time the speckle pattern movement amounts reach a distance corresponding to one channel for example.

More specifically, the optical system in FIG. 1 is arranged such that each time the actual speckle patterns of the specimen W are moved by 10 μm, the reference data remain as they are, but the data sources with respect to which the cross-correlation functions of the reference data are to be calculated, are shifted by a distance corresponding to one channel. Even though the data sources are shifted in such a manner, the relative intensity is lowered to make it difficult to identify the position of the maximum intensity if the speckle pattern movement amounts exceed a certain amount. Accordingly, the channels are shifted by stages in the range which does not exceed such a limit, such that the reference data are also renewed in a manner similar to that in the embodiment above-mentioned. According to such an arrangement, the initial observation points can be followed in a finer manner and a reduction in relative intensity is gentle. When it is supposed that the amounts of channel shifts for renewing the reference data at a certain point of time, are set to C1, C2, that the speckle pattern movement amounts calculated by the first and second movement amount calculating units 41, 42 at the point of time above-mentioned, are set to S1, S2 and that the accumulated values of shift amounts of the data sources from moment to moment, are set to D1, D2, the movement amounts $\delta_1, \delta_2$ of the observation points at the point of time above-mentioned, are expressed as follows;

$$\delta_1 = (C_1 + D_1 + S_1)$$

$$\delta_2 = (C_2 + D_2 + S_2)$$

Figure 3:
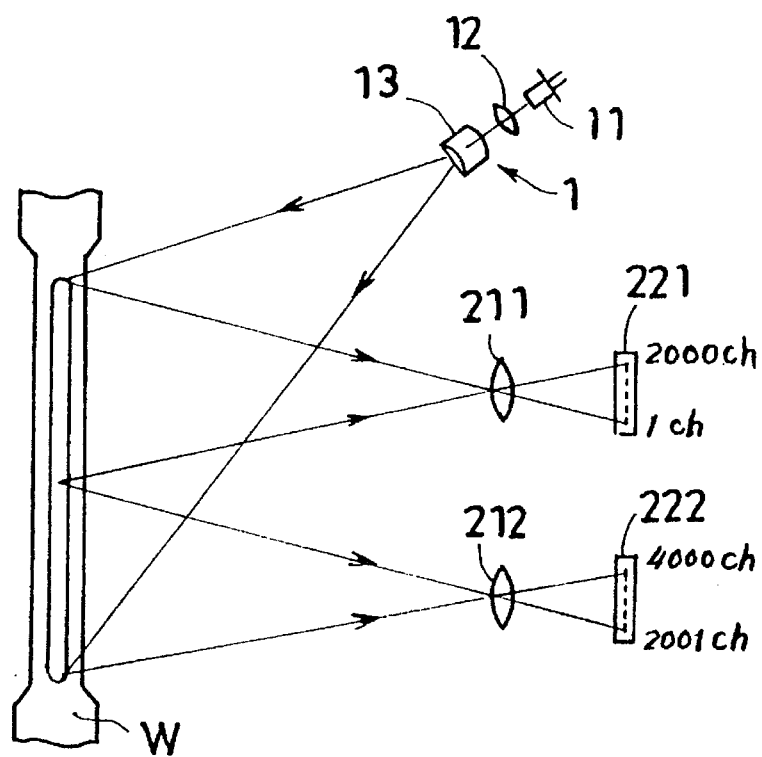
FIG. 3 is a view illustrating the arrangement of the optical system in another embodiment of the present invention.

In the embodiment above-mentioned, the entire zone to which laser light is irradiated by the irradiation optical system 1, is observed by the single one-dimensional image sensor 22. As shown in FIG. 3, however, the present invention may be arranged such that two one-dimensional image sensors 221, 222 are disposed in the direction of elongation of the specimen W, and that two condensing lenses 211, 212 are disposed for vertically dividing, into two portions, the scattering light reflected from the laser light irradiation zone and introducing the scattering light thus divided into two portions, to the image sensors 221, 222, respectively. According to the arrangement in FIG. 3, when each of the positional relations among the image sensors 221, 222, the condensing lenses 211, 212 and the specimen W is made equal to that in FIG. 1, each of the image sensors 221, 222 can measure a zone of 20 cm such that a total zone of 40 cm can be measured by the image sensors 221, 222. When three sets of similar image sensor and similar condensing lens are disposed, a zone of 60 cm can be measured.

Thus, when a plurality of image sensors are used for measuring scattering light as spatially divided, the image sensors may be disposed such that the respective images on the image sensors are continuous or partially overlap. In such a case, even though two image sensors each having 2000 channels are disposed as separated from each other, signals from the image sensors may be handled, as if a signal from a single image sensor having continuous 4000 channels, in the same manner as that in the embodiment mentioned earlier. Accordingly, such an arrangement can be applied to a measurement in which the gage-point distance is long, or to a measurement of a sample presenting a large elongation.

Figure 4:
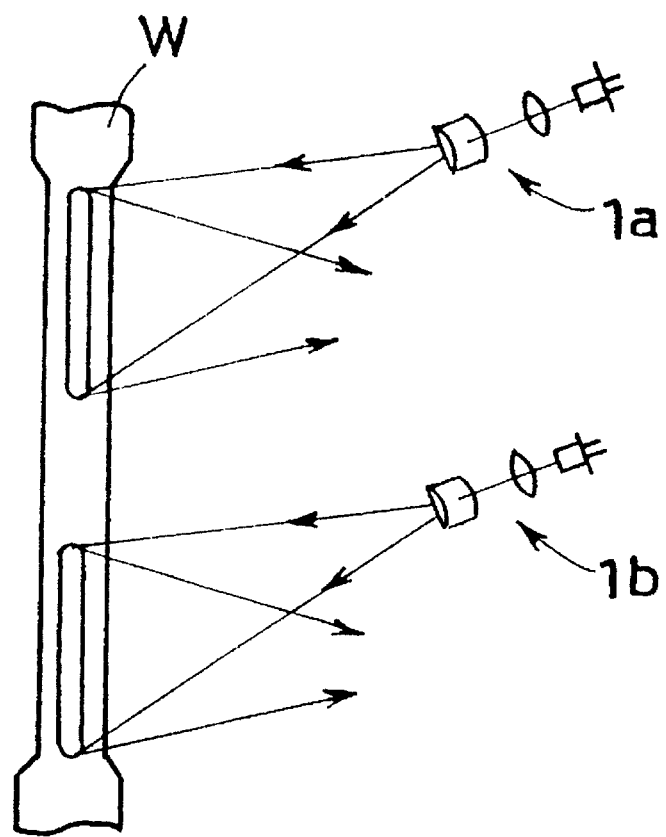
FIG. 4 is a view illustrating the arrangement of main portions of the optical system in a further embodiment of the present invention.

The zone of the specimen W to which laser light is irradiated, is not necessarily a single continuous linear zone as shown in the embodiments above-mentioned. As shown in FIG. 4, two irradiation optical systems 1a, 1b each similar to the irradiation optical system 1 in FIG. 1, may be disposed as corresponding to two observation points, respectively. In such a case, the laser light irradiation zone is vertically divided into two portions which extend on the same line in the elongation direction of the specimen W. In this arrangement, the elongation can be measured within the range where the upper and lower observation points do not deviate from the irradiation zone portions. When such irradiation optical systems are employed, scattering light detecting optical systems may be disposed as corresponding to the two irradiation zone portions, respectively. When laser light irradiation onto an unnecessary portion is eliminated in such a manner, this improves the efficiency for increasing the laser power per unit area. This is effective in improvement in S/N of the data.

Further, the image sensor 22 is not limited to a one-dimensional image sensor, but may be a two-dimensional image sensor also having dozens pixels in directions at right angles to the direction of elongation to be measured. Such an arrangement is advantageous in that the speckle pattern data to be obtained will contain more pieces of information and that elongation measurement can be continued even though the specimen W is transversely moved.

The laser light to be irradiated onto the surface of the specimen W is not limited to a stationary linear light. Provision may be made such that, with the use of a polygon mirror for example, the specimen W is scanned at a high speed in the elongation measuring direction by a spotlight in synchronism with the frame rate of the image sensor or at a cycle sufficiently faster than the frame rate above-mentioned, such that laser light is substantially linearly irradiated.

In each of the embodiments above-mentioned, linear laser light is merely fixedly irradiated onto the surface of the specimen W. It is therefore not possible to see, with the naked eyes, (i) the positions of the specimen W in which the first and second zones serving as the initial observation points set by the setting device 3, are located, and (ii) the positions to which these zones are moved with the advance of the test. To inform the positions of the specimen W in which the first and second zones are located, provision may be made such that the specimen W is photographed by a camera for example, that the resulting image is displayed on a monitor display such as a CRT or the like, and that marks or the like representing the respective zones are displayed as superimposed on the image, based on (i) the contents of the observation points initially set by the setting device 3 and (ii) the calculation results of δ1 and δ2.

Figure 5:
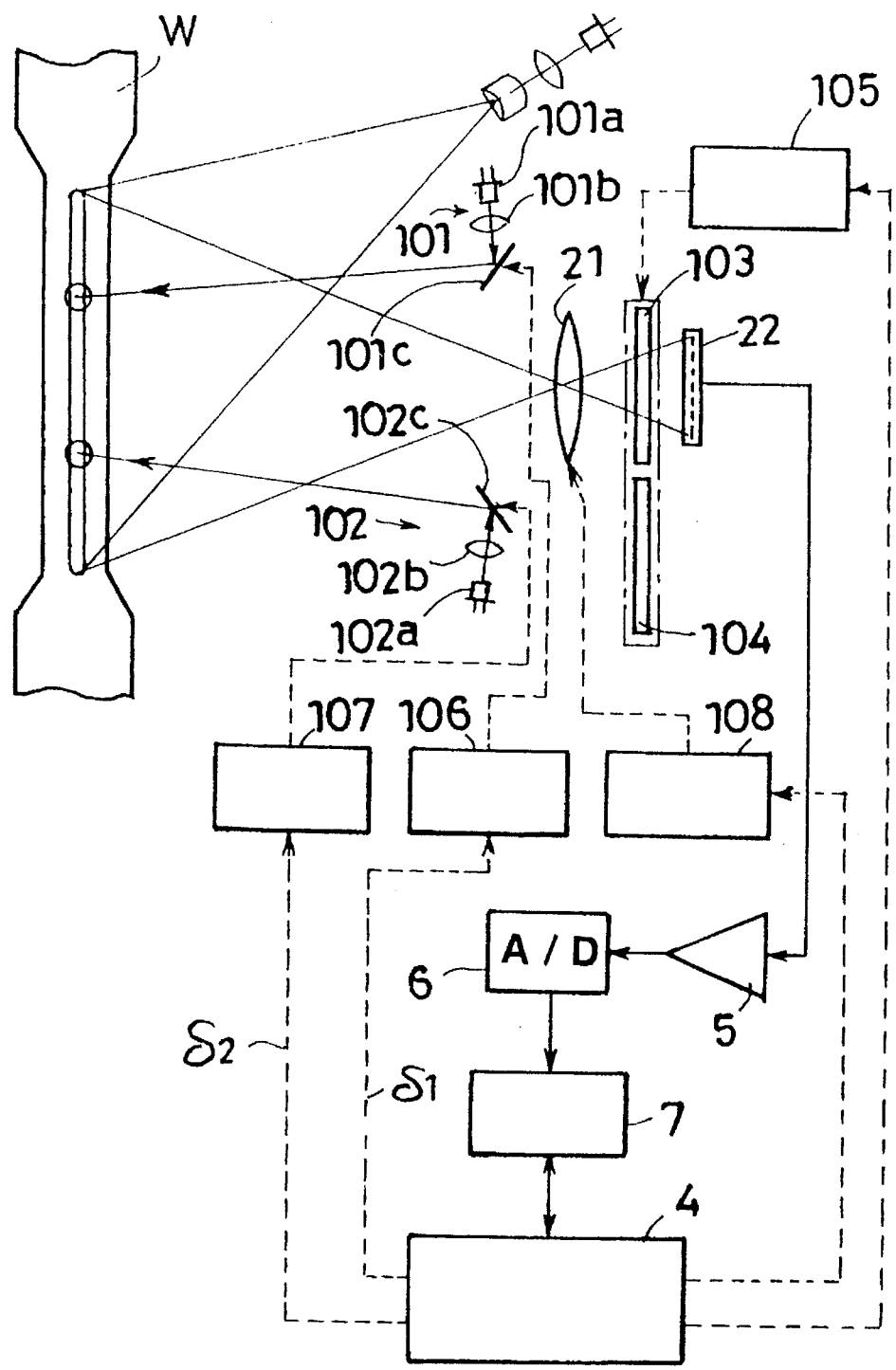
FIG. 5 is a schematic view illustrating the general arrangement of still another embodiment of the present invention.

Further, there may be employed an arrangement schematically shown in FIG. 5 in which spotlights representing observation points (gage points) are directly irradiated onto the surface of a specimen W.

In an embodiment in FIG. 5, each of an irradiation optical system 1, scattering light detecting means 2, scattering light data sampling means, a memory 7 and an operating unit 4 is similar in basic arrangement to that shown in FIG. 1. However, provision is made such that either a band pass filter 103 or a band pass filter 104 is selectively inserted between a condensing lens 21 of the scattering light detecting means 2 and a one-dimensional image sensor 22 by a filter selecting driver 105. This filter selecting driver 105 is arranged to be operated by an instruction supplied from the operating unit 4.

Irradiated to the specimen W are (i) laser light from the irradiation optical system 1 and (ii) two marker laser lights in the form of spotlights from two marker laser light irradiation optical systems 101, 102 for illuminating the observation points. For example, the wavelength of each of the marker laser lights is 680 nm and the wavelength of the measuring laser light from the irradiation optical system 1 is 780 nm. The band pass filter 103 transmits only light having a narrow wavelength band around the wavelength of 680 nm, while the band pass filter 104 transmits only light having a narrow wavelength band around the wavelength of 780 nm.

The marker laser light irradiation optical systems 101, 102 are arranged such that output lights from semiconductor lasers 101a, 102a are made in the form of spotlights by lenses 101b, 102b and that the laser lights are irradiated onto the surface of the specimen W through movable mirrors 101c, 102c. The movable mirrors 101c, 102c are respectively controlled in angle by mirror drive mechanisms 106, 107 to be operated by an instruction from the operating unit 4.

The condensing lens 21 of the scattering light detecting means 2 is arranged to be moved on the optical axis by an automatic focus mechanism 108 to be operated by an instruction from the operating unit 4.

In this embodiment, a setting device 3 for initially setting the observation points, serves as a circuit for supplying a control signal to the mirror drive mechanisms 106, 107 for controlling the angles of the movable mirrors 101c, 102c of the marker laser light irradiation optical systems 101, 102. The setting device 3 is arranged to be operated by the operator such that two marker laser lights are irradiated to two optional parts of the specimen W, thus setting the initial positions of two observation points directly on the specimen W.

When the initial positions of observation points are set by irradiating marker laser lights onto the specimen W in the manner above-mentioned, (i) the operating unit 4 supplies an instruction to the filter selecting driver 105 to select the band pass filter 103 for 680 nm, (ii) two marker laser spot images are formed on the one-dimensional image sensor 22, (iii) the center positions of the marker laser lights are measured based on the output of the one-dimensional image sensor 22 and (iv) the measurement result is stored as the initial positions of the two observation points. Here, when it is difficult to determine the spot center positions due to the speckle information contained in the scattering light reflected from the specimen W, the following measure may be taken. That is, the output of the one-dimensional image sensor 22 is integrated while the drive currents of the semiconductor lasers 101a, 102a are changed to change the speckles at random. This eliminates noise due to speckles to make it easier to obtain the spot center positions.

At this time, the focus of the condensing lens 21 is adjusted. More specifically, when the condensing lens 21 is in focus, the peak profile presents the lowest half-width. Based on the half-width of the peak of the reflected light of either one of the two marker laser lights, the automatic focus mechanism 108 is driven to adjust the focus of the condensing lens 21. Accordingly, provision is made such that, when measuring the actual elongation by measuring the scattering light of the laser light from the irradiation optical system 1, there is not exerted an influence of a back-and-forth movement of the specimen W even though the measuring laser light is not parallel light. Further, the distance between the condensing lens 21 and the surface of the specimen W can be calculated from the focus information. Thus, the accurate magnification of an scattering light image can advantageously be obtained. At the same time, the initial distance between the gage points on the specimen W is obtained from (i) the distance between the gage points on the one-dimensional image sensor 22 at the time when the measurement starts, and (ii) the magnification thus obtained.

When such a series of operations relating to the initial setting have been finished, the filter selecting driver 105 is driven to switch the band pass filter to the band pass filter 104 for 780 nm and the measurement is started. The measuring operations are the same as those conducted in the embodiment in FIG. 1. However, the calculation results of observation-point movement amounts δ1, δ2 from moment to moment are supplied to the mirror drive mechanisms 106, 107 to control the movable mirrors 101c, 102c in angle, such that the marker laser light irradiation positions are changed as following the movements of the observation points. The precision of the marker laser light irradiation positions with the movement of the observation points, is not required to be particularly accurate in that these markers are put merely for informing the operator of the movement situations of the observation points.

To set the initial observation points (gage-points), there may also be proposed the following method with the use of technique of (i) obtaining the magnification by calculating, from the focus information, the distance between the condensing lens 21 and the surface of the specimen W and (ii) obtaining, based on the magnification thus obtained, the initial gage-point distance on the specimen W. That is, the operator sets the gage-point distance and only one of the two observation points (gage points) by irradiating a marker laser light. Then, the operating unit 4 automatically sets the other observation point, to which a marker laser light is then irradiated.

I claim:

1. An elongation measuring method comprising the steps of:

irradiating laser light onto the surface of a specimen over a predetermined length thereof in the direction of elongation to be measured;

photoelectrically converting that scattering light of said laser light which has been reflected from said specimen surface, thereby to obtain speckle pattern data;

initially setting, as selected from said speckle pattern data, the data from two zones on said specimen which are separated from each other by a predetermined distance in said elongation direction, said data being set as observation point data;

calculating, with the use of said observation point data, the amounts of movement of the speckle patterns from said two zones on said specimen;

shifting, in the direction of movement of said speckle patterns, the zones serving as observation point data sources each time the calculation results of said movement amounts reach a predetermined amount; and calculating the elongation of said specimen between said initially set two zones based on (i) the shift amounts of said observation point data sources and (ii) said speckle pattern movement amounts calculated with the use of said observation point data.

2. A laser noncontact extensometer comprising:

an irradiation optical system for irradiating laser light onto the surface of a specimen over a predetermined length thereof in the direction of elongation to be measured;

scattering light detecting means having a plurality of channels for receiving that scattering light of said laser light reflected from said specimen, thereby to obtain speckle pattern data;

setting means for initially setting, out of output data from said scattering light detecting means, two data of a plurality of channels relating to the scattering light from two zones on said specimen which are separated from each other by a predetermined distance in said elongation direction, said two data being set as two observation point data;

movement amount calculating means for calculating, with the use of said two observation point data, the amounts of movement of the speckle patterns from said two zones on said specimen;

channel shift control means for shifting the channels to be used as observation point data sources in the speckle pattern moving direction according to said movement amounts calculated by said movement amount calculating means, each time said movement amounts reach a predetermined amount; and elongation calculating means for calculating the elongation of said specimen between said two zones initially set by said setting means, based on (i) the amount by which the channels relating to said two observation point data have been shifted by said channel shift control means, and (ii) said amounts of movement of speckle patterns from said two zones, calculated by said movement amount calculating means.

3. A laser noncontact extensometer according to claim 2, wherein said scattering light detecting means comprises an image sensor having a plurality of channels and a condensing lens for forming an image of scattering light on the light receiving surface of said image sensor.

4. A laser noncontact extensometer according to claim 3, wherein scattering light from the laser light irradiation zone is received, as spatially divided into portions, by a plurality of sets of condensing lens and image sensor disposed in the elongation measuring direction.

5. A laser noncontact extensometer according to claim 2, wherein said irradiation optical system comprises: a semiconductor laser; a collimator lens for converting light supplied from said semiconductor laser into a parallel light flux; and a beam expander having two cylindrical lenses for one-dimensionally expanding laser light which has passed through said collimator lens.

6. A laser noncontact extensometer according to claim 5, wherein said irradiation optical system is disposed in a plural number, said irradiation optical systems being arranged, as a whole, to irradiate laser light onto the surface of said specimen at a zone thereof extending in the direction of elongation to be measured.

7. A laser noncontact extensometer according to claim 6, wherein that laser light irradiation zone of said specimen surface onto which laser light is to be irradiated by said irradiation optical systems, is divided into two portions in said direction of elongation to be measured.

8. A laser noncontact extensometer according to claim 7, wherein said scattering light detecting means is disposed for each of said two divided portions of said laser irradiation zone.

9. A laser noncontact extensometer according to claim 2, further comprising:

a camera for taking a picture of a specimen; and a display device for displaying an image based on an image signal supplied from said camera, the positions of said two zones serving as two observation point data sources being superimposed, from moment to moment, on said specimen image displayed by said display device based on (i) the contents set by said setting means and (ii) said amount by which said channels have been shifted by said channel shift control means.

10. A laser noncontact extensometer according to claim 3, further comprising:

marker light irradiation optical systems for irradiating, onto said specimen, two spotlights of which wavelengths are different from the wavelength of the laser light from said irradiation optical system; and drive mechanisms for changing the irradiation positions of said spotlights on said specimen, said setting means being arranged to detect, based on an output of said image sensor, the irradiation positions of said two spotlights which are irradiated onto said specimen by the operator with the use of said marker light irradiation optical systems, the detected results being set as the initial positions of two observation points.

11. A laser noncontact extensometer according to claim 10, wherein said drive mechanisms are arranged to change, from moment to moment, the irradiation positions on said specimen of two spotlights from said marker light irradiation optical systems, based on the amount by which the channels have been shifted by said channel shift control means.

12. A laser noncontact extensometer according to claim 11, wherein in order to prevent the reflected lights of said spotlights from said marker light irradiation optical systems from exerting an influence upon an output of said image sensor during elongation measurement, there is disposed, upstream of said image sensor, a band pass filter arranged such that only the measuring laser light from said irradiation optical system, is selectively incident on the light receiving surface of said image sensor.

* * * * *